United States Patent
Orlebeke

(10) Patent No.: US 6,802,956 B2
(45) Date of Patent: Oct. 12, 2004

(54) ELECTROLYTIC TREATMENT OF AQUEOUS MEDIA

(75) Inventor: David N. Orlebeke, McMinnville, OR (US)

(73) Assignee: Aquatic Technologies, McMinnville, OR (US)

(*) Notice: Subject to any disclaimer, the term of this patent is extended or adjusted under 35 U.S.C. 154(b) by 131 days.

(21) Appl. No.: 10/163,813

(22) Filed: Jun. 5, 2002

(65) Prior Publication Data

US 2003/0226766 A1 Dec. 11, 2003

(51) Int. Cl.[7] .............................................. C02F 1/461
(52) U.S. Cl. ...................... 205/701; 205/742; 205/759; 205/760; 210/632
(58) Field of Search .............................. 205/701, 742, 205/759, 760; 210/632

(56) References Cited

U.S. PATENT DOCUMENTS

| | | |
|---|---|---|
| 4,619,745 A | 10/1986 | Porta et al. |
| 5,364,508 A | 11/1994 | Weres et al. |
| 5,427,667 A | 6/1995 | Bakhir et al. |
| 5,460,702 A | 10/1995 | Birkbeck et al. |
| 5,531,865 A | 7/1996 | Cole |
| 5,560,816 A | 10/1996 | Robinson |
| 5,614,078 A | 3/1997 | Lubin et al. |
| 5,897,757 A * | 4/1999 | Sano ........................... 204/284 |
| 6,117,285 A | 9/2000 | Welch et al. |
| 6,284,144 B1 | 9/2001 | Itzhak |
| 6,296,744 B1 | 10/2001 | Djeiranishvili et al. |
| 6,315,886 B1 * | 11/2001 | Zappi et al. ................. 205/701 |
| 6,328,875 B1 * | 12/2001 | Zappi et al. ................. 205/500 |
| 6,346,197 B1 | 2/2002 | Stephenson et al. |

* cited by examiner

Primary Examiner—Arun S. Phasge
(74) Attorney, Agent, or Firm—Kolisch Hartwell, P.C.

(57) ABSTRACT

A variety of pollutants and other contaminants may be removed from a variety of aqueous media using electrolytic treatments. The treatment includes inserting an anode and a cathode into the medium undergoing treatment, and applying a high current and voltage to the electrodes. The treatment may also include the addition of catalytic enzymes to the medium undergoing treatment. The present methods are compatible with aquatic lifeforms, and offer an effective alternative to chemical-based water treatment systems.

28 Claims, 2 Drawing Sheets

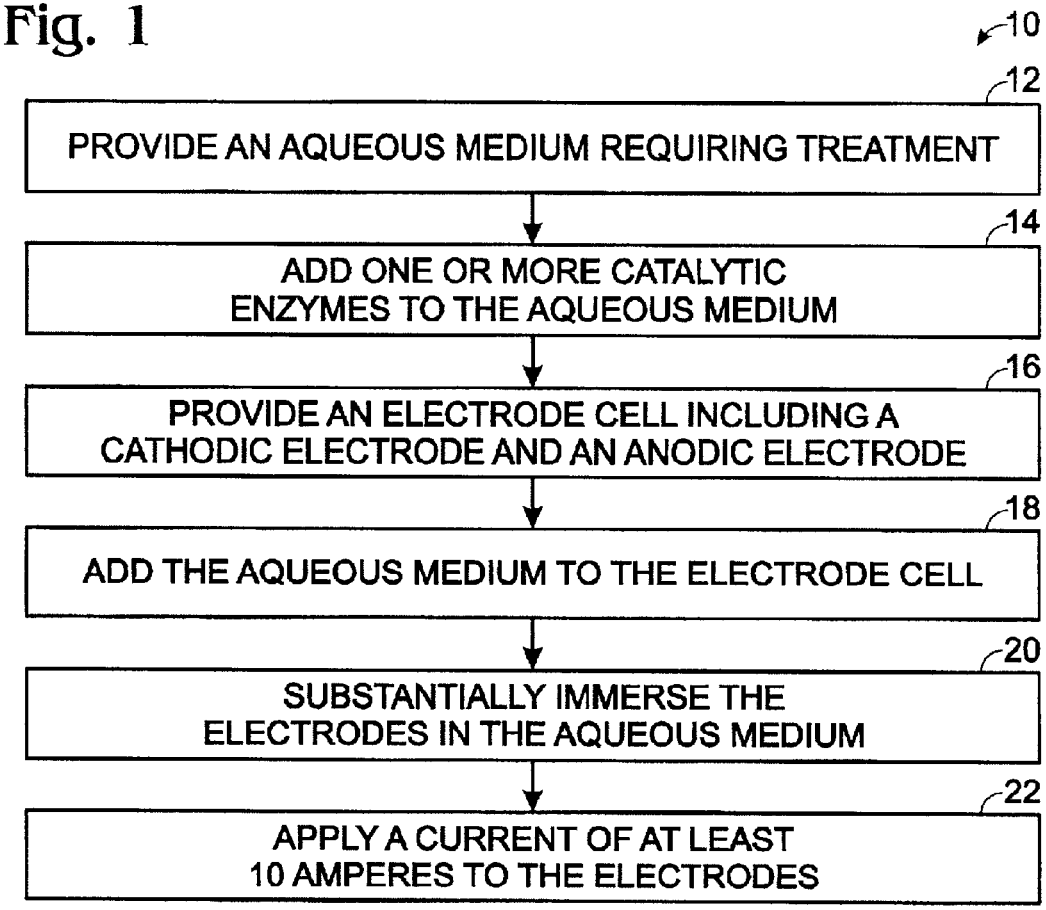
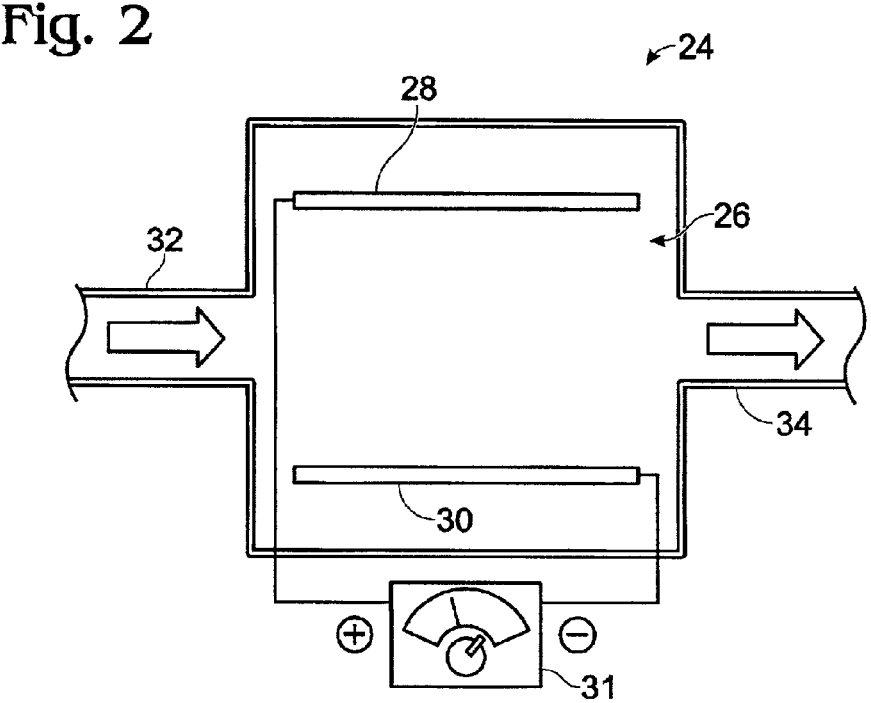

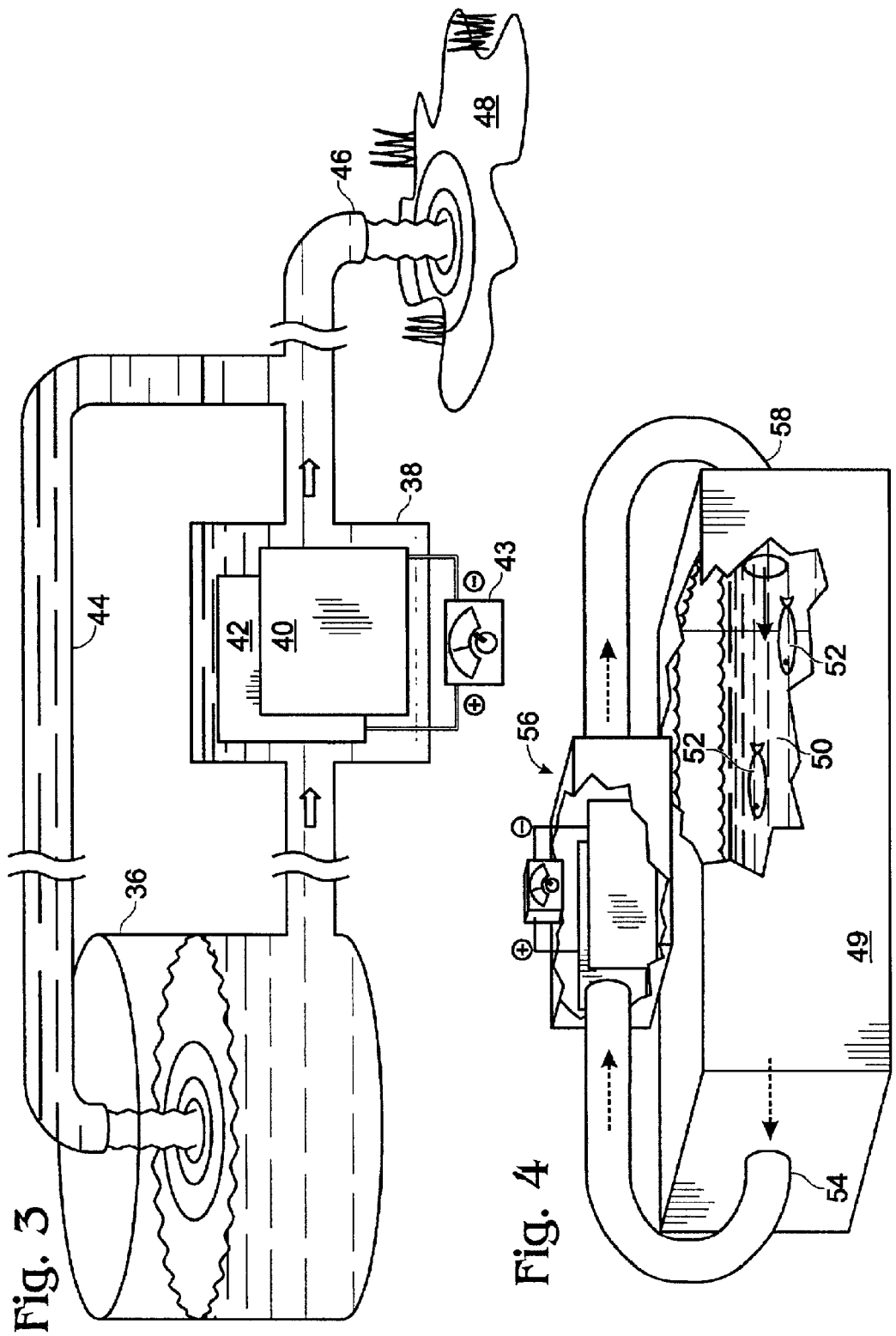

US 6,802,956 B2

ELECTROLYTIC TREATMENT OF AQUEOUS MEDIA

FIELD OF THE INVENTION

The present invention relates generally to electrolytic treatment of water, and more particularly, to the electrolytic removal of pollutants and/or waste products in freshwater systems, including industrial waste streams and aquaculture media.

BACKGROUND OF THE INVENTION

Electrolysis is typically defined as a process whereby an electric current is passed through an electrolytic solution or other appropriate medium, and a chemical reaction is triggered thereby. Typically, electrolysis corresponds to the breaking (or lysis) of a chemical bond by an electric current. Although electrolytic methods have been used to reduce or remove pollutants from aqueous solutions, these methods have been generally ineffective or inefficient with respect to producing water suitable for either release into the environment, or for use as a medium for supporting aquatic life.

SUMMARY OF THE INVENTION

The invention provides an electrolytic process for removing contaminants from an aqueous medium. The process includes adding one or more catalytic enzymes to the aqueous medium, providing an electrode cell that includes a cathodic electrode and an anodic electrode, adding the aqueous medium to the electrode cell so that the electrodes are substantially immersed in the aqueous medium, and applying a current of at least 10 amperes across the electrodes.

BRIEF DESCRIPTION OF THE DRAWINGS

FIG. 1 is a flowchart depicting a method of electrolytically treating aqueous media according to an aspect of the present invention.

FIG. 2 is a schematic representation, viewed from above, of an electrolytic cell according to an aspect of the present invention.

FIG. 3 is a schematic representation of an electrolytic wastewater treatment system according to an aspect of the present invention.

FIG. 4 is a schematic representation of an electrolytic aquaculture medium treatment system according to an aspect of the present invention.

DETAILED DESCRIPTION OF THE PREFERRED EMBODIMENTS

The preferred embodiments described herein include electrolytic methods for removing pollutants from aqueous systems. The methods described herein are generally applicable regardless of the particular electrode used or the particular chemical make-up of the aqueous solution. The present methods are compatible with freshwater aquatic lifeforms, and offer an effective alternative to chemical-based water treatment systems.

As shown flowchart 10 of FIG. 1, the treatment method typically includes providing an aqueous medium (12), adding one or more catalytic enzymes to the aqueous medium (14) providing an electrode cell including a cathodic electrode and an anodic electrode (16), adding the aqueous medium to the electrode cell (18), substantially immersing the electrodes in the aqueous medium (20), and applying a current to the electrodes (22).

Typically, the electrolytic treatment includes immersing a pair of electrodes (a cathode and an anode) in the medium, and applying a current of at least 10 amperes to the electrodes. As shown in FIG. 2, while the electrodes may be inserted directly into the body of aqueous medium, they are typically placed in an electrode cell 24 that also contains at least some of the medium to be treated 26. The anode 28 and cathode 30 are generally inserted into the medium sufficiently far so that they are substantially immersed in the medium, and current is applied to the electrodes by an associated power supply 31. Where the electrode pair is located in an electrode cell, the cell is optionally a flow-through cell having an intake 32 and an output 34, so that a flow of the aqueous medium can be configured to pass through the cell.

Where the electrodes are inserted into a flow of an aqueous medium, the flow may correspond to wastewater, or discharge from any or a variety of industrial processes. As shown in FIG. 3, a tank 36 of wastewater discharges into electrode cell 38 containing electrodes 40 and 42 for electrolytic treatment. The treated water may be recirculated back to the wastewater tank 36 for subsequent additional treatment, as shown by the recirculation pathway 44, or if the water has been satisfactorily treated, it may be directly or indirectly discharged into the environment, for example into a stream, lake, or ocean, as shown by discharge outlet 46 and water body 48. The wastewater treatment system may also include additional filters, pumps, settling tanks, or other components that are not shown in FIG. 3 for the purposes of clarity.

Although electrolytic treatment may be sufficiently effective that the wastewater may be discharged after a single passage through the electrode cell, more typically the electrode cell forms part of a recirculating treatment system. The treatment system may include one or more holding tanks, settling tanks, or other media reservoirs. As an alternative to being discharged after treatment, the flow of treated medium may be retained for reuse or recycling in one or more industrial processes.

In a particular aspect of the invention, the electrolytic process is used to treat a freshwater aquaculture medium, or the water supply used to support one or more stocks of cultured aquatic species, as shown schematically in FIG. 4. Aquaculture tank 49 holds aquaculture medium 50 and one or more stock species 52. Medium 50 may be contaminated with ammonia, algae, as well as a variety of other pollutants. Medium 50 is pumped via water intake 54 to an electrode cell 56, where the medium is electrolytically treated. The purified medium is returned to tank 49 via discharge pipe 58.

The aqueous medium undergoing treatment may be a freshwater aqueous medium. As used herein, freshwater media typically have a salt content of less than about 0.5 parts per thousand (5,000 ppm).

The electrolytic water treatment of the invention typically employs a high current flow. The strength of a current of electricity is typically expressed and measured in amperes. At high currents, the electrolytic treatment is able to more efficiently break down complex chemical substances in the medium undergoing treatment. The treatment may employ currents of greater than about 5 amperes, and more typically employs currents of greater than about 10 amperes. The use of electrode currents greater than about 20 amperes may also be advantageous.

Media treatment at elevated current levels has demonstrably decreased the time needed to physically break down organic contaminants present in the medium undergoing treatment, such as hay and alfalfa (typically present in manure lagoons), fructose and other sugars (typically present in wastewater from fruit packing or juice manufacturing facilities), and/or unprocessed fats and flesh (typically present in meat processing plant effluent), among others. Typically, the more complex the organic contaminant, the greater the need for sufficient current to efficiently break down the organic solids, and speed the treatment of the contaminated effluent.

In addition to the use of high applied currents, the use of overpotential voltage levels in the treatment process may also enhance treatment. Very high applied electrode potentials may effect the desired oxidative or reductive reactions used to treat the wastewater. This applied potential typically corresponds to between about 30 and about 100 volts DC. The utilization of such high electrode potentials typically corresponds to an "overpotential" in the electrolytic system under treatment.

An electrochemical reaction occurring at an electrode surface typically requires an input of sufficient energy in order for the reaction to proceed. This energy is referred to as the "activation energy". Even where sufficient potential is applied to an electrode to equal the activation energy, the desired reaction may proceed only slowly.

However, if an even greater electric potential is applied, the energy of the electrons in the electrode is increased. The applied potential decreases the height of the barrier that must be overcome and increases the rate of electron transfer. This extra applied potential is referred to as an "overpotential", and it corresponds to the voltage required to sustain a particular rate of electron transfer.

Although a given overpotential value is dependent upon the electrode material and on the current density, generally speaking, the greater the rate of electron transfer desired, the greater the overpotential that should be applied.

The application of an electrolytic overpotential offers several advantages over electrolytic water treatment performed at lower voltages. The application of a strong overpotential to the electrodes permits electrolytic processes to occur that might otherwise not be permitted, producing chemical species having enhanced oxidative or reductive potentials. In addition, the application of an overpotential enhances the kinetics of the reactions involved, greatly speeding up the rate of treatment. An applied overpotential also creates a larger electrolytic field around the electrodes, reducing the sensitivity of the water treatment to any particular interelectrode spacing or orientation.

Without wishing to be bound by theory, it is believed that the electrolytic water treatment process described herein generates a variety of active oxidizing and reducing agents, that in turn serve to neutralize and/or break down undesirable contaminants in the medium under treatment. Oxidizing agents typically produced during aqueous electrolytic treatment may include, without limitation, monotomic oxygen, singlet-state diatomic oxygen, hydroxyl radicals, hydrogen peroxide, and superoxide anion. In general, the greater the applied overpotential, the greater the amount of oxidizing agents produced during treatment, regardless of the particular solution pH or temperature.

Operational costs associated with water treatment may be reduced by using the treatment processes of the invention, as the mechanical systems required are typically simpler and less expensive than those required for previously described electrolytic treatments. In addition, the claimed treatment process does not require the addition of electrolyte to enhance the conductivity of the water undergoing treatment, reducing purchase costs and the need to remove the added electrolyte after treatment but before use and/or discharge.

Electrodes. The particular physical configuration of the electrodes used in the treatment processes of the invention are typically not critical to the efficacy of the treatment. The electrodes used may take any of a variety of physical forms, including a mesh, a rod, a hollow cylinder, a plate, or multiple plates, among others. The electrode must typically provide sufficient surface area for creation of the necessary electrolytic field when the overpotential is applied.

Although a particular electrode configuration is not required for performing the treatment process, the use of plate electrodes has been found to be advantageous. In particular, plate electrodes having between 8 and 11 electrode plates that are spaced approximately 0.5 inches apart in parallel have been shown to permit sufficient applied overpotential in even low-conducting water streams (such as tap water) for the purposes of the present invention. As long as the plate electrodes are configured so that the likelihood of capturing large organic solids from the media flow is minimized, the configuration of each plate is not critical. For example, the plate electrodes may be substantially solid or include a hexagonal mesh. By minimizing the possibility of fouling by organic solids, the chances of forming a short between the anode and cathode are minimized, and typically the media flow restrictions through the electrode cell are simultaneously reduced.

The particular composition of the electrode is also not overly critical, provided that the electrode material is sufficiently robust to withstand the elevated voltage and current levels applied during the electrolytic process of the invention, without excessive degradation of the electrode. A given electrode may be metallic or nonmetallic. Where the electrode is metallic, the electrode may include platinized titanium, among other compositions. Where the electrode is nonmetallic, the electrode may include graphitic carbon, or any of a variety of conductive ceramic materials. Ceramic electrodes have the potential of providing enhanced durability, biocompatibility, and affordability. Where the electrolytic process is used to treat aquaculture media, it is preferable that the electrode composition is selected so that metal oxides are not leached into the media, to the detriment of the stock species.

The anode and cathode of the electrode cell may have any of a variety of different compositions and/or configurations. The anode and cathode may also be substantially equivalent in order to facilitate bipolar operation, as discussed below.

The electrode cell used to carry out the electrolytic process of the invention may also include a reference electrode. A reference electrode is an electrode that has a well known and stable equilibrium electrode potential that is used as a reference point against which the potential of other electrodes may be measured. While any electrode that fulfills the above requirements is a suitable reference electrode for the purposes of the invention, typical reference electrodes include silver/silver-chloride electrodes, calomel electrodes, and normal hydrogen electrodes, among others.

Bipolar Operation. Electrolytic processes may generate thin films or deposits on the electrode surfaces that can lower the efficiency of the water treatment process. Descaling of the electrodes to remove some films may be carried out by periodically reversing the polarity of operation (switching the anode and cathode plates to the opposite polarity).

Automatic logic controls may permit programmed or continuous descaling, further reducing labor and maintenance costs. Alternating electrode bipolar operation may increase the ability to continuously treat a given water stream, and decrease the rotational time required for effective treatment. For these reasons, among others, periodic bipolar operation may greatly increase the economic viability of using electrolytic systems, regardless of the particular industrial application.

Voltage, Rotation And Time. Electrolytic treatments of water are typically dependent upon time and "rotation", where rotation is the number of times that the pollutant-bearing water has passed through an electrode chamber. The progress of a given course of water treatment may be measured as a function of the water rotation and the amount of voltage applied. In general, the higher the applied voltage, the fewer rotations or exposures to individual electrode chambers, vats, or tanks are required for purification of the water under treatment.

As there are numerous possible chemical reactions and equilibria being created and destroyed simultaneously inside the electrode chamber, no set mathematical formula exists for predicting the number of rotations and voltage output required to oxidize a specific chemical compound or species. However, there are formulae that are applicable to recirculation in a closed system that may assist in determining the actual number of rotations necessary to treat a specific body of water. For example, formulae exist for determining the theoretical number of rotations of a known water volume through a given pump, filter, electrode chamber, etc., so that at least 99.9% of the water volume has passed at least once through the pump, filter, electrode chamber, etc. However, actual results must be based on previous test results or other experimentation in order to determine the best treatment regime for a particular water sample, as no two water systems contain the exact same pollutants and/or chemical compounds.

The application of increased potentials (overpotentials) and the resulting effectively increased electrode spacing generally permit greater flow rates, and a concomitant reduction of the number and/or size of both electrodes and electrode chambers, regardless of whether the electrode chamber has a closed or open design. The treatment process of the invention may be effective even with flow rates of, for example, from about 300 to about 2,000 gallons per minute (gpm) in recirculating systems.

Catalytic Enzymes. "Catalytic enzymes," as used herein, refer to enzymes that are useful in the degradation and/or solubilization of organic matter in order to enhance a water treatment process. Catalytic enzymes serve as a concentrated source of enzymes capable of catalytically accelerating the digestion of waste accumulations and aiding the elimination of organic accumulations in the water undergoing electrolytic treatment. Catalytic enzymes have been widely used to speed the oxidation of hydrocarbons and aromatics from fuel and crude oil spills in both marine and freshwater. Catalytic enzymes have also been applied to sewage and septic systems in order to reduce the degree of compacting therein and re-open leach fields. In aquaculture, various catalytic enzymes are used to emulsify feces and excess feed, reducing fouling of bioreactors and mechanical filters. Enzyme treatment also reduces water replacement and increases the speed at which ammonia, nitrite and nitrates are bio-oxidized.

Useful catalytic enzymes include without limitation one or more members of the following enzyme classes: phosphatases (including alkaline phosphatase and acid phosphatase), esterases, catalases, dismutases, nucleotidases, proteases (including peptidases), amylases, lipases, uricases, gluconases, lactases, oxygenases, and cellulases. Preferably, the catalytic enzymes used in the present invention include one or more hydrolytic enzymes, or hydrolases. For example, a mixture of catalytic enzymes may include one or more protease enzymes, one or more amylase enzymes, and one or more lipase enzymes. The particular composition of enzymes used may vary with the type and amount of contaminants in the water undergoing treatment, and the amount and type of catalytic enzymes added may therefore be tailored to the individual situation.

Catalytic enzymes may be added to the medium undergoing treatment before or during treatment by electrolysis. The catalytic enzymes may be added in substantially pure form, or added as a homogeneous or heterogeneous mixture that includes other components. Catalytic enzymes typically perform multiple functions that increase the efficiency of the electrolytic treatment, generally by converting complex chemical compounds in the water into less complex species. This degradation increases the efficiency of the oxidative processes generated during electrolysis. A particular source of catalytic enzymes useful in conjunction with the treatment described herein is Orenda Technologies (Trumbull, Conn.), which supplies suitable enzyme mixtures under the product names CV-600, CV-605, CV-610, and CV-635.

A substantial advantage of the use of catalytic enzymes is the reduction or elimination of biofilms at the electrode surface. A "biofilm" is the result of growth of various living organisms on the electrodes, and is common in fresh and marine water systems. Such microorganism growth increases scaling at the electrode surface, and reduces the efficiency of the electrode, requiring increasing voltage levels in order to yield the same results. The presence of active catalytic enzymes may dissolve biofilms already in place, and help prevent the formation of new biofilms. In particular, the use of catalytic enzymes in conjunction with periodic bipolar operation (as described above) may reduce or even eliminate routine electrode maintenance, which has been a commercially limiting factor in other electrolytic treatment processes.

The presence of active hydrolytic enzymes exponentially increase the rate at which organic contaminants are degraded. As the organic components are broken down into smaller fragments, the need for mechanical filtration is decreased, and plugging or clogging of the electrode is reduced. Additionally, the rate at which reduction/oxidation processes clear the chemical species in the medium is also increased. Tests using catalytic enzymes in conjunction with electrolytic systems to treat freshwater aquaculture media have generated increased production capacities, and a reduction in the organic solids accumulating in bioreactors and mechanical filters.

Flocculating Agents. In some cases, a flocculating agent may be added to the water undergoing electrolytic treatment, to help clarify the water or selectively remove one or more impurities. Gentle mixing of the water and the flocculating agent typically causes the selected impurities or other particles to coagulate into larger floc particles. The larger floc particles may then be removed by sedimentation, filtration, or other processes. Selected flocculating agents include charged polymers (including cationic or anionic polymers), ferric chloride, and aluminum sulfate (alum), among others.

In particular, the addition of lanthanum (III) chloride to the water under treatment has been shown to both reduce phosphoric acid production and increase the conductivity of the water under treatment. The lanthanum salt is typically added as lanthanum (III) chloride heptahydrate ($LaCl_3 \cdot 7 H_2O$). Lanthanum (III) chloride is a useful flocculating agent for orthophosphate, and thereby reduces the creation of the phosphoric acid that might otherwise be an unwanted by-product of the electrolytic process in various water treatment regimes. In addition, lanthanum (III) has a conductivity-increasing ability close to that of sodium ($Na^+$). Lanthanum chloride dosage levels are based on orthophosphate levels and additional pollutants in the source water, such as carbonates, selenium, chromium, and iron, which are also flocculated by the lanthanum (III) chloride. Unless exposed to acidic water levels (pH lower then 4), the lanthanum flocs resist release of phosphates and other minerals and metals when exposed to voltage levels of less then approximately 20 volts DC and currents of less than 39 amperes. It may be that higher current levels may reduce the efficiency of the lanthanum methodology.

A flocculating agent may be added to the water undergoing treatment in combination with one or more catalytic enzymes, or other treatment additives. The catalytic enzyme mixture CV-635, as sold by Orenda Technologies (Trumbull, Conn.), already includes lanthanum (III) chloride.

Applications of the Preferred Embodiments

The electrolytic water treatment processes of the invention possess a variety of industrial applications. Bioengineering processes, chemical and biological weapons manufacture, silicon wafer production, electrosputtering, electroplating, and complex metal alloy production techniques all generate complex chemical compounds that standard chlorination/bromine, ozone, and ultraviolet radiation treatment systems have traditionally failed to neutralize. Treatment with hydroxide ions, peroxide, ozone and other electrolytically generated oxidizers may also fail to neutralize these compounds. In order to effectively reduce/oxidize these chemicals, higher voltages than have been previously employed must be provided at the electrode.

In addition, the commercial viability of the instant treatment processes are enhanced through the elimination of the need for electrolyte additives, as many of these additives may create unwanted chemical species or reactions outside of the electrolytic process itself, necessitating further processing after the electrolytic processing before discharge of the treated water.

For example, trihalomethanes (THM's) and chlorodibromomethanes (for example $CHB_2Cl$) are carcinogenic by-products created by the reaction between chlorine and bromine with organic solids. Electrolytic oxidation of trihalomethanes and chlorodibromomethanes compounds by various oxygen species has been widely tested, but has been limited by the voltage levels applied, requiring the use of electrolyte additives to increase the conductivity of the water prior to treatment. By increasing the applied potential the need for an electrolyte additive is removed. The application of voltage potentials of between 70 and 100 volts DC is sufficient to produce between 30 and 40 volts output at the electrodes in a solution having a conductivity of less than 1 milliSiemen (standard tap water). The application of an overpotential allows for on-site treatment of such compounds in wastewater and freshwater treatment plants without the need for electrolyte additives. This methodology can also be applied to the oxidation/reduction of MTBE (methyl tertiary-butyl ether), an oxygenating additive typically used in gasoline and currently a major pollutant in fresh water sources in thirteen states. As MTBE represents a fairly complex chemical species, past attempts to oxidize this chemical have had limited success. Again, the use of an appropriate hydrolytic enzyme or enzymes may facilitate the electrolytic degradation of compounds such as MTBE.

Effectively complete reduction of MTBE levels in fresh water may be accomplished within 30 rotations of the water sample through a single electrode chamber utilizing a voltage output of 40 volts DC at currents as low as 10 amperes. Again, the applied overpotential increased the speed at which the MTBE levels were reduced, making treatment of larger water systems and higher flow rates possible.

Bicarbonate and carbonate removal. Wastewater that contains bicarbonate salts and carbonate salts at concentrations higher than 300 ppm may be damaging to crops, streams, lakes, and ponds. Typically, high levels of bicarbonates and carbonates must be mediated through caustic acid treatments. However, the electrolytic process of the invention may remove bicarbonates and carbonates from water sources rapidly by converting the bicarbonate or carbonate to carbon dioxide ($CO_2$) which spontaneously off-gasses to the air. Electrolytic treatment of water containing 86 ppm of bicarbonate and 70 ppm of carbonate at an applied voltage of 9 volts DC at 25 amperes reduced those compounds to non-detectable levels within six rotations of the water volume through the electrode cell, while an applied voltage of 40 volts at 26 amperes required only two rotations through the electrode cell. The electrolytic treatments decreased the pH level of the water to less than 7.6, requiring no additional treatment of the water prior to its use in crop irrigation.

Efficient reduction of bicarbonate and carbonate levels may be achieved using electrolytic cells or chambers that apply at least 30 volts of potential at currents above approximately 15 amps. Through the manipulation of the number of active electrodes used and the number of water volume rotations applied, the amount of carbonates and bicarbonates that are removed may be controlled, independent of flow rate through the electrode cell. Carbonate and bicarbonate reduction may be achieved with flow rates of between about 150 and 2,000 gpm.

Bicarbonate and carbonate level requirements differ from crop to crop, and application to application. The use of a high applied voltage may permit a significant degree of operator control of the level of carbonate reduction, making application of the water treatment process of greater value to the end-user. With proper logic controllers, electrolytic power controllers may be pre-set to achieve virtually any carbonate/bicarbonate reduction level desired, even when the actual levels of carbonate/bicarbonate ions vary in the storm or wastewater water sources.

Coal Bed Well Water. Coal beds invariably contain water that must typically be removed before methane gas can be recovered from the bed. This recovered coal bed water may contain high concentrations of metal and mineral salts (sodium, magnesium, potassium, and calcium) which prevents the water from being applied to clay-type soils. In addition, before coal bed well water may be used for irrigation, or dumped into a local river or stream, chloride levels in the water must be reduced. Bicarbonate and carbonate levels in the well water may also be above standard agricultural guidelines, requiring labor-intensive and expensive topical treatment to cropland if the water is to be used for irrigation.

By exposing the coal bed well water to medium voltage levels (30–70 volts DC) the chloride ion present in solution may be rapidly converted to hydrochloric acid and chlorine.

These, in turn, may be permitted to off-gas directly to the atmosphere, or they may be captured and neutralized using any of a variety of traps, plasma degassers and/or scrubbers. This treatment may also force the sodium and the other various metals and minerals to form aggregates with each other and with hydroxide ions—permitting their direct discharge to clay-type soils without creation of water resistant crusts.

The electrolytic treatment of coal bed well water may drive the pH of the water stream to a level close to 0, but continued treatment typically results in the pH elevating back to an alkaline level as the hydrochloric acid and chlorine is off-gassed. The higher the operating voltage, the faster the production of hydrochloric acid. This methodology allows electrolytic treatment of coal bed well water, and creates an economically viable use for such water. The electrolytic processes described herein may have utility for removing chlorides and chlorine from water systems, whether aeration by air injection, diffuser, de-gassing tower, or atomization sprayer is utilized or not.

Manure Lagoons. Most manure lagoons contain numerous acre-feet of water (where one acre-foot is approximately equal to 326,000 gallons). Active lagoons may receive upwards of 75–100 tons of raw manure per day. Microbial oxidation (either aerobic or anaerobic) of the effluent is highly dependent upon water temperature, making microbial treatment during the colder winter months difficult, if not impossible.

Electrolytic treatment of manure lagoon effluent has had limited application due to the heavy organic solids load of such systems. These undissolved organics include undigested hay and alfalfa, which plug and/or clog conventional electrodes or electrode chambers. However, the application of an electrolytic overpotential permits the spacing between the anode and the cathode to be greatly increased, reducing the likelihood that solids will be trapped by the electrodes themselves, resulting in a "dead short" in the electrode. By minimizing clogging (and thus labor costs) and potential shorts, electrolytic treatment of manure lagoons is made significantly more viable.

The application of catalytic enzymes in combination with electrolytic treatment reduces the size and complexity of the undissolved organics, further reducing the potential for electrode clogging, decreasing or eliminating the need for pre-mechanical filtration, and speeding the rate of organic degradation by various electrolytically generated species. In addition, since electrolytic processes are not greatly affected by temperature, the methodology of using enzymes and overpotential electrolysis permits treatment of manure effluent in colder climates, helping resolve a major pollutant issue that faces many mid-western and northern states.

Aquaculture Media. The electrolytic processes of the invention are particularly useful for treating freshwater aquaculture media, where they are able to reduce ammonia, nitrite and nitrate levels, the main pollutants generated by the aquatic species as they are reared, resulting from the stock species metabolic process and respiration, fecel material and/or excess feed. The use of overpotential electrolysis speeds the elimination of these nitrogenous compounds, greatly reducing the need for bioreactors, and permitting an increased stocking density and feeding regime. The application of high potential to the electrode cell results in the reduction of ammonia to nitrite, nitrite to nitrate, and nitrate to various benign chemical species and gases.

Electrolytic treatment according to the invention is also able to reduce the numbers of pathogenic bacteria in aquaculture media, including aeromonas, pseudomonas, septicemia, streptococcus, as well as various destructive molds, and fungi. This effect is enhanced where catalytic enzymes are also utilized. Without wishing to be bound by theory, it is believed that the enzymes help dissolve the durable cell wall of various molds and fungi and anaerobic microbes, interrupting the air/water interface at the cell wall, and permitting access to the various oxidizing agents produced by the electrolytic method. The use of catalytic enzymes thus results in faster purification times than is observed using electrolytic treatment alone.

The use of electrolytic treatment in combination with catalytic enzymes has also been found to inhibit algae growth in aquaculture media. Again, it is believed that the catalytic enzyme is able to dissolve the protective waxy-like sheath of the outer cellular wall of phytoplanktonic and zooplanktonic algae and thereby sensitize the algae to the electrolytic treatment.

The use of electrolytic processes to treat aquaculture media may increase the commercial viability of freshwater aquaculture. The decreased rotational time needed for useful nitrogen-compound removal, combined with the reduction or elimination of the need for additional electrolyte in order to increase water conductivity, results in greater production levels and a smaller operational "footprint" for the treatment system—both important factors in the commercial aquaculture industry.

The treatment process of the invention possesses utility for removing a variety of unwanted contaminants from freshwater media, particularly aquaculture media or industrial wastewaters, and may provide one or more of the following advantages:

Destruction and/or reduction of bicarbonate and carbonate ions

Reduction of chloride ion levels

Accelerated oxidation and/or reduction of organic contaminants, particularly in conjunction with catalytic enzymes Destruction of chlorine, chloramine and chlorinated organic compounds Reduced or eliminated need for added electrolyte in order to provide sufficient solution conductivity for treatment Reduced or eliminated need for pre-filtering when treating heavy organic loads Increased media flow rates Reduced production of phosphoric acid Increased commercial viability of electrolytic water treatment Increased production levels for freshwater aquaculture

EXAMPLES

The following examples describe selected aspects and embodiments of the invention, including methods for electrolytically treating selected aqueous media. These examples are included for illustration and are not intended to limit or define the entire scope of the invention.

Example 1

Electrolysis of fruit processing effluent. Fruit processing effluent was treated according to the present invention. The effluent contained heavy organic matter (cherry skins) as well as 36 degrees brix of sugar. 150 Gallons of fruit effluent was acquired from Meduri Farms of Dallas, Oreg. Prior to treatment, the effluent contained 65 ppm nitrite, 108 ppm nitrate, 35 ppm ammonia ($NH_3/NH_4^+$), and 29.6 ppm phosphate ($PO_3^-/PO_4^{2-}$). Salinity was measured at 18 ppt. The initial pH was 2.43. A Hanna C103 spectrophotometer was used to measure nitrogen and phosphate compounds. A digital salinity meter (American Marine, Inc., Ridgefield Conn.) was used to determine salinity. Several dilutions were required before ammonia and nitrate levels could be determined.

Fifty gallons of the effluent was placed inside a 55-gallon drum. A submersible pump (Little Giant Pump Co., Oklahoma City, Okla.) was used to pump the effluent through the electrode cell and return the effluent to the same 55-gallon drum. A flow meter was placed on the discharge line. A flow rate of 15 gpm was maintained throughout the test. The current applied to the electrodes was 10 amperes DC.

The effluent temperature at the beginning of the test was 54 degrees F. Following conclusion of the test, effluent temperature had risen to 98 degrees F. due to the heat of the pumping process. Ammonia, nitrite and nitrate levels were determined every 45 minutes. The test was repeated three times at different output currents, using 50 gallons of effluent each time. All other parameters were the same.

TABLE 1

Fruit Effluent Processing at 10 amperes applied current

|  | Initial Levels | 45 minutes | 90 minutes | 120 minutes |
| --- | --- | --- | --- | --- |
| pH | 2.43 | 5.69 | 2.43 | 2.43 |
| Phosphate | 29.6 | 0.00 | 29.6 | 29.6 |
| Ammonia | 35 | 0.63 | 0.002 | 0.00 |
| Nitrite | 65 | 0.23 | 0.006 | 0.00 |
| Nitrate | 108 | 10.65 | 0.00 | 0.00 |
| Sugars | 36 brix | 33 brix | 33 brix | 33 brix |

TABLE 2

Fruit Effluent Processing at 17 amperes applied current

|  | Initial Levels | 45 minutes | 90 minutes | 120 minutes |
| --- | --- | --- | --- | --- |
| pH | 2.43 | 5.69 | 2.43 | 2.43 |
| Phosphate | 29.6 | 0.00 | 29.6 | 29.6 |
| Ammonia | 35 | 0.29 | 0.00 | 0.00 |
| Nitrite | 65 | 1.07 | 0.05 | 0.00 |
| Nitrate | 108 | 3.05 | 1.13 | 0.00 |
| Sugars | 36 brix | 33 brix | 33 brix | 33 brix |

TABLE 3

Fruit Effluent Processing at 24 amperes applied current

|  | Initial Levels | 45 minutes | 90 minutes | 120 minutes |
| --- | --- | --- | --- | --- |
| pH | 2.43 | 6.13 | 2.43 | 2.43 |
| Phosphate | 29.6 | 0.00 | 29.6 | 29.6 |
| Ammonia | 35 | 0.16 | 0.00 | 0.00 |
| Nitrite | 65 | 0.76 | 0.00 | 0.00 |
| Nitrate | 108 | 1.09 | 0.00 | 0.00 |
| Sugars | 36 brix | 32 brix | 32 brix | 32 brix |

The application of high current values may be necessary to break down complex sugars in solution. Without wishing to be bound by theory, it is possible that the decrease and subsequent increase in phosphate is due to intermediate production of ammonium phosphate, with regeneration of phosphate upon removal of ammoniacal nitrogen. As the amperage applied to the effluent is increased, the rate of breakdown of nitrogen compounds is similarly increased.

Example 2

Purification of aquaculture media—prawn/koi. The freshwater supply for a 50'×3'×3' heated raceway containing a mixture of prawns and koi was treated using a single flow-through electrode cell for a three month period. The raceway was located inside a 50'×30' greenhouse. Acceptable levels of ammonia, nitrite and nitrate were maintained throughout the test.

Water level was maintained at 16 inches in the raceway, providing approximately 1,500 gallons of water (approximately 5,700 liters). Water temperature was maintained at 84 degrees F. during the day, with an approximate 2 degree drop during nighttime hours. A 1 horsepower heat pump provided the heat source for the raceway. A surface skimmer (360 degree no-niche skimmer) was located near the main suction line at one end of the raceway. The water discharge was located underwater at the opposite end of the raceway. No biological filter was utilized. The skimmer was attached to a 50 ft$^2$ cartridge filter (Hayward Pool Products, Inc., Elizabeth, N.J.), which was operated every 3–4 days in order to remove floating debris from the raceway.

The raceway was stocked with approximately 1,500 post-larva freshwater prawn (*M. rosenbergii*) approximately 0.5 inches in size. The prawn were placed at the head of the raceway, contained between two 1-inch fiber mat containment walls. The remaining twenty-foot segment of the raceway was stocked with four large koi that were suffering from abrasions due to an episode of night-fright, with one suffering a full body pierce at the base of the tail. All four injured koi were placed in the raceway to observe the ability of the electrolytic water treatment to prevent or reduce secondary infections. After 60 days, fifty-five 4-5" koi were added to the twenty-foot segment of the raceway.

From day 1 through day 90 of the trial, the prawn and koi were fed to satiation twice per day, with the addition of 4 ounces of catfish sinking pellets to the prawn section each night. Burris Mill's larvae prawn feed at a 52% protein level was used throughout the test period. Hai Feng Quick Grow floating medium sized pellet was fed to the large koi. Quick Grow contains 34% protein from fish and shrimp meal.

The conductivity of the raceway water was initially set at 1150 ppm, and the electrode cell was configured to apply a current of 3.5 amps via a platinum-coated titanium mesh electrode, with a water flow rate of 65 gpm through the cell. Water treatment was continued 24 hours per day. Once per week, 2-3 ounces of a catalytic enzyme mixture was added to the raceway water to speed emulsification of fecal and organic wastes, until enzyme application was halted after 45 days.

The raceway water contained no detectable phosphate, ammonia, nitrite or nitrate prior to the introduction of the various stock species. The water was allowed to recirculate through the electrode cell for 5 days prior to introduction of the koi fish and prawns. The amount of dissolved oxygen present in the water was measured directly in front of the discharge water and also at the 49' mark at the opposite end of the raceway. No other aeration of the water was performed.

Weekly readings were made of dissolved oxygen, ammonia ($NH_3/NH_4^+$), nitrite, nitrate, pH and phosphate. No water changes were performed, although approximately 280 gallons of well water (adjusted to a conductivity of 1150 ppm with sodium bicarbonate) was added to the raceway each week to compensate for water lost through evaporation. The initial pH of the raceway water was 7.5.

Except for the measurement of dissolved oxygen, all other tests were conducted using water samples taken directly from the section enclosing the freshwater prawn. It was believed that the concentrations of nitrogen pollutants would be greatest in this area.

The pH of the raceway water fluctuated between 7.3 and 7.8 throughout the trial period, due to evaporative losses of volume and replenishment.

Ammonia levels (non-ionized ammonia) remained at or below 0.0005 ppm throughout the study. The maximum value of 0.0005 ppm was measured at the end of the 90 day study, with average ammonia levels at 0.0002 ppm. Ammonia levels were calculated based on the total ammonia ($NH_3/NH_4^+$) after adjustment for pH and temperature (according to Colt's theory). The temperature of a water sample was maintained at 20° C. for 24 hours prior to the performance of the actual test.

Nitrite levels, as expressed as $NO_2$—N, held at a consistent 0.007 throughout the trial period. Nitrate levels after 30 days were measured at 0.17 ppm. After 60 days, nitrate levels were measured at 6.84 ppm. After 90 days, nitrate levels were measured at 10.9 ppm.

Initial dissolved oxygen measurement was 9.71 ppm immediately adjacent to the discharge water at 82 degrees F. prior to the introduction of prawn and koi. At 49' further down the raceway, the dissolved oxygen was measured at 8.21 ppm. From Day 1 to Day 60, dissolved oxygen was measured (±0.7 ppm) as 9.93 ppm at the discharge end, and 7.65 ppm at the 49' mark. After day 60, with the introduction of the fifty-five 4–5" koi, dissolved oxygen levels were reduced at the 49' mark to 6.68 ppm.

Phosphate levels at day 30 were measured at 0.015 ppm. Day 60 showed a rise to 0.56 ppm and day 83 was measured at 0.76 ppm. Hair algae was noted to have appeared inside the prawn section, with the strands of algae measuring approximately ¼" in length.

Following day 90, the water in the raceway was reduced to approximately 4", and the prawn, which now measured an average of 3", were moved to the middle of the raceway, the large koi and the smaller koi were both removed from the raceway. The larger koi were totally healed. After the prawns were relocated, the organic waste trapped within the prawn area was removed. A sludge layer of approximately 0.5" had accumulated in the prawn area.

At the end of the trial, the smaller koi measured an average of 6.24" inches. Each koi was physically checked and showed no signs of wounds or external parasites. In particular, there were no signs of anchor worm or any abrasions/lesions. The wounds that had been suffered by the larger koi had totally healed, and the scales on the tail of the koi that had been spine-pierced were beginning to grow.

The electrolytic treatment maintained acceptable levels of ammonia, nitrite and dissolved oxygen within the raceway. The use of catalytic enzymes also reduced nitrate levels, as well as reducing sludge build-up by approximately 50%. The growth of hair-like algae was only observed after the addition of catalytic enzyme was discontinued. Water clarity was maintained throughout the study, and at no time throughout the study was the bottom of the raceway not visible.

Example 3

Purification of aquaculture media—perch fingerlings. A recirculating 50,000-gallon tank system was used to stock yellow perch fingerlings. The tank system was composed of 4–10,000 gallon tanks and a 10,000-gallon biofilter. Each tank drained by gravity to a drum filter, and the drum filter output was then pumped to trickle bead design biofilter and returned to the main tanks. Prior to employing an electrolytic water treatment according to the present invention, the tank system could accommodate a stocking ratio of no more than one-half pound of fish per gallon of water. At this ratio, ammonia levels could not be decreased below 2.5–2.0 ppm, thereby requiring replacement of 15,000–20,000 gallons, or more, or approximately 40% of the total tank system water volume.

A single electrode unit was employed, operating at 14 amperes and 6.6 volts DC with a flow rate of 80 gpm through the electrode cell. In addition, catalytic enzymes were periodically added to the tank system water supply. Ammonia levels were reduced from 2.5 ppm to non-detectable levels within 14 hours of electrolytic treatment. After five days at non-detectable ammonia levels, the fish stocking load was increased from one-half pound per gallon to three-quarters of a pound per gallon. Ammonia levels rose within 2 hours to 0.05 ppm, but were reduced again to non-detectable levels at the end of 8 hours of continuous treatment. Non-detectable ammonia levels were maintained for a period of four weeks, exception periodic elevations due to calcium scaling on the electrodes. Upon cleaning of the electrodes, ammonia levels returned to 0.05 ppm or less within several hours. The use of catalytic enzymes reduced biological fouling, and therefore reduced the need for flushing of the bio-filter, and improved water clarity tremendously.

Stocking levels of up to one-pound per gallon were maintained over the long term with no notable rise in ammonia levels, notwithstanding a feeding regime utilizing 42% protein feed 4 times per day to satiation. The only required adjustment to the tank system was an increase in oxygen feed levels.

Example 4

Reduction of bicarbonate in wastewater. A 55-gallon sample of non-potable wastewater from the city of Casper (WY) was electrolytically treated with 17.9 amperes at 49 volts DC, at a water flow rate of 50 gpm. After 60 minutes of treatment, bicarbonate content had been reduced from 150 ppm to undetectable values, and nitrate content was reduced from 15 ppm to undetectable levels. The treatment also removed the unpleasant odor and color of the wastewater sample.

Example 5

Treatment of coal bed methane well water. A hard water sample taken from a coal bed methane well was treated with lanthanum chloride heptahydrate and catalytic enzyme mixture. Six aliquots of the well water were electrolytically treated according to the present invention at an applied current of 25 amperes and 13 volts DC. Each of the sample demonstrated a reduction in carbonate and bicarbonate content.

TABLE 4

Coal bed methane well water contaminants (data in ppm (mg/l))

| | untreated | #1 | #2 | #3 | #4 | #5 | #6 |
|---|---|---|---|---|---|---|---|
| $CaCO_3$ | 58.0 | 7.0 | ND | ND | ND | ND | ND |
| $HCO_3$ | 71.4 | 7.9 | ND | ND | ND | ND | ND |
| calcium | 7220 | 7220 | 7160 | 7130 | 7160 | 7100 | 7110 |
| $CO_3$ | ND | ND | ND | ND | ND | ND | ND |
| chloride | 43200 | 43700 | 42700 | 42600 | 43300 | 43100 | 42000 |
| magnesium | 2150 | 2150 | 2130 | 2120 | 2120 | 2100 | 2100 |
| potassium | 141 | 150 | 150 | 148 | 146 | 144 | 143 |
| sodium | 17700 | 17700 | 17600 | 17500 | 17500 | 17400 | 17400 |
| sulfate | 76.5 | 76.3 | 67.2 | 66.9 | 66.0 | 65.4 | 65.7 |
| conductivity | 102000 | 102000 | 102000 | 103000 | 102000 | 102000 | 102000 |
| soluble salt (ppm) | 65280 | 65280 | 65280 | 65920 | 65280 | 65280 | 65280 |
| pH | 6.9 | 5.2 | 3.6 | 3.2 | 3.0 | 3.1 | 2.8 |
| dissolved solids | 77900 | 88600 | 79100 | 78300 | 79300 | 78800 | 79100 |
| arsenic | 0.003 | 0.004 | ND | ND | 0.003 | 0.002 | 0.003 |
| chromium | ND | ND | ND | ND | ND | ND | ND |
| iron | 11.6 | 0.757 | 3.08 | 9.82 | 11.1 | 11.4 | 11.2 |
| selenium | 0.002 | 0.003 | 0.003 | 0.004 | 0.004 | 0.003 | 0.003 |
| arsenic (III) | ND | ND | ND | ND | ND | ND | ND |
| arsenic (V) | 0.002 | 0.004 | 0.001 | ND | 0.003 | 0.001 | 0.003 |
| selenium (IV) | ND | ND | ND | ND | ND | 0.001 | ND |
| selenium (VI) | 0.003 | 0.003 | 0.003 | 0.004 | 0.004 | 0.002 | 0.003 |

As demonstrated, the electrolytic treatment dramatically reduces carbonate and bicarbonate levels.

Example 6

Treatment of oil production water. Oil production water having an initial salinity of 30% and water hardness of greater than 600 ppm was treated according to a method of the present invention with an applied current of 25 amperes at 9 volts DC and a flow rate of 40 gpm.

An initial treatment of 42 gallons of wastewater for 6.5 hours reduced the salinity to 25%. Free chlorine levels were measured at 2 ppm, with obvious production of chlorine gas. The observed rapid drop in pH denotes the disproportionationa of NaCl to HCl and NaHCl. Treatment at higher voltages (46 volts DC at 19.7 amps) produced a pH drop from 6.8 to 1.3 within 10 rotations.

Catalytic enzyme mixture (1.5 tablespoons) was added to an additional 42 gallons of wastewater, and the wastewater was electrolytically treated for 10 hours. A great deal of foam was produced, and free chlorine gas was observed. After treatment, the salinity of the sample was also 25%, with water hardness still at 600 ppm.

The addition of lanthanum chloride heptahydrate to the oily wastewater reduced the measured salinity 3%, with formation of a heavy precipitate. The treatment produced heavy calcification and chloride salt build-up at the electrodes, which were readily cleaned with light scraping and rinsing with water.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

What is claimed is:

1. An electrolytic process for removing contaminants from an aqueous medium, comprising:
    adding to the aqueous medium one or more catalytic enzymes;
    providing an electrode cell including a cathodic electrode and an anodic electrode;
    adding the aqueous medium to the electrode cell, so that the electrodes are substantially immersed in the aqueous medium; and
    applying a current of at least 10 amperes across the electrodes.

2. The process of claim 1, where the potential across the electrodes is at least 30 volts.

3. The process of claim 1, wherein the current is at least 20 amperes.

4. The process of claim 1, further comprising periodically reversing the polarity of the electrodes.

5. The process of claim 1, wherein the aqueous medium is directed into the electrode cell from a water supply, and then returned to the supply.

6. The process of claim 5, wherein the catalytic enzyme is added to the water supply.

7. The process of claim 5, further comprising adding a flocculating agent to the water supply.

8. The process of claim 7, wherein the flocculating agent is lanthanum (III) chloride.

9. The process of claim 1, wherein at least one of the anodic electrode and cathodic electrode includes a platinized titanium electrode.

10. The process of claim 1, wherein the aqueous medium is freshwater.

11. An electrolytic process for treating a freshwater aquaculture medium, comprising:
    providing a supply of freshwater;
    adding one or more catalytic enzymes to the supply of freshwater;
    providing a flow-through electrode cell including a cathodic electrode and an anodic electrode;
    directing a stream of the freshwater supply through the electrode cell, so that the electrodes are substantially immersed in the stream;
    applying a current of at least 10 amperes to the electrodes; and
    returning the treated stream to the supply of freshwater.

12. The process of claim 11, where one or more of the catalytic enzymes includes a hydrolase enzyme.

13. The process of claim 11, wherein the catalytic enzymes include at least one phosphatase enzyme, esterase enzyme, catalase enzyme, dismutase enzyme, nucleotidase enzyme, protease enzyme, amylase enzyme, lipase enzyme, uricase enzyme, gluconase enzyme, lactase enzyme, oxygenase enzyme, or cellulase enzyme.

14. The process of claim 11, wherein the current applied to the electrodes is at least 20 amperes, and the potential across the electrodes is greater than approximately 30 volts.

15. The process of claim 11, further comprising periodically reversing the polarity of the electrodes.

16. The process of claim 11, wherein the supply of freshwater supports one or more stock species.

17. The process of claim 11, wherein the stream of freshwater is directed through the electrode cell at a flow rate in the range of between 100 and 2000 gallons-per-minute.

18. The process of claim 11, wherein ammonia is electrolytically removed from the freshwater supply.

19. An electrolytic process for treating wastewater, comprising:

adding a flocculating agent to the wastewater;

providing an electrode cell including a cathodic electrode and an anodic electrode;

directing a stream of wastewater through the electrode cell, so that the electrodes are substantially immersed in the water stream; and applying a current of at least 10 amperes to the electrodes where the potential across the electrodes is at least 30 volts.

20. The process of claim 19, wherein the electrolytic process decreases the concentrations of bicarbonate and carbonate in the wastewater.

21. The process of claim 19, wherein the wastewater is circulated from and returned to a manure lagoon.

22. The process of claim 19, wherein the wastewater is coal bed well water.

23. The process of claim 22, wherein the electrolytic process decreases the concentrations of chloride, bicarbonate, and carbonate in the coal bed well water.

24. The process of claim 19, wherein the flocculating agent is lanthanum (III) chloride.

25. The process of claim 19, wherein the electrolytic process decreases the concentrations of organic contaminants.

26. The process of claim 19, wherein the electrolytic process proceeds without the addition of electrolyte to the wastewater.

27. The process of claim 19, wherein the stream of wastewater is directed through the electrode cell at a flow rate in the range of between 100 and 2000 gallons-per-minute.

28. An electrolytic process for treating wastewater, comprising:

providing an electrode cell including a cathodic electrode and an anodic electrode;

circulating a stream of wastewater from a manure lagoon through the electrode cell, so that the electrodes are substantially immersed in the water stream;

applying a current of at least 10 amperes to the electrodes where the potential across the electrodes is at least 30 volts;

returning the wastewater to the manure lagoon; and adding one or more catalytic enzymes to the manure lagoon.

* * * * *